United States Patent
Langhorst (10) Patent No.: US 11,548,494 B2
(45) Date of Patent: Jan. 10, 2023

(54) LAP LEARNING FOR VEHICLE ENERGY MANAGEMENT OPTIMIZATION

(71) Applicant: FORD GLOBAL TECHNOLOGIES, LLC, Dearborn, MI (US)

(72) Inventor: Benjamin R. Langhorst, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 938 days.

(21) Appl. No.: 16/272,546

(22) Filed: Feb. 11, 2019

(65) Prior Publication Data

US 2020/0254992 A1    Aug. 13, 2020

(51) Int. Cl.
| | |
|---|---|
| B60W 20/12 | (2016.01) |
| G06N 20/00 | (2019.01) |
| B60W 20/13 | (2016.01) |
| B60W 20/19 | (2016.01) |

(52) U.S. Cl.
CPC .......... *B60W 20/12* (2016.01); *B60W 20/13* (2016.01); *B60W 20/19* (2016.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,687,607 B2 * | 2/2004 | Graf | ........................ | B60L 1/003 701/99 |
| 7,958,958 B2 * | 6/2011 | de la Torre Bueno | ...................... | B60W 10/26 701/469 |
| 8,005,587 B2 * | 8/2011 | Tamor | ................... | B60W 20/12 903/917 |
| 8,447,450 B2 | 5/2013 | Hennings et al. | | |
| 9,174,653 B2 * | 11/2015 | Lentz | .................. | B60W 50/082 |
| 9,266,443 B2 * | 2/2016 | Payne | ..................... | B60L 58/12 |
| 9,266,529 B2 * | 2/2016 | Dufford | ............... | B60W 10/06 |
| 9,290,108 B2 * | 3/2016 | Payne | ................ | G01C 21/3461 |
| 9,701,302 B2 * | 7/2017 | Matsunaga | ........... | B60W 10/06 |
| 9,896,086 B2 * | 2/2018 | Ogawa | ................... | B60L 58/13 |
| 9,919,715 B2 * | 3/2018 | Tseng | ................. | B60W 50/082 |

(Continued)

FOREIGN PATENT DOCUMENTS

DE    102013215519 A1    2/2015

OTHER PUBLICATIONS

Zhu, Qilun, et al. Control Optimization of a Charge Sustaining Hybrid Powertrain for Motorsports. No. 2018-01-0416. SAE Technical Paper, 2018.

*Primary Examiner* — Jonathan M Dager
(74) *Attorney, Agent, or Firm* — David B Kelley; Brooks Kushman P.C.

(57) ABSTRACT

A system for a vehicle includes a powertrain configured to propel the vehicle, and a controller configured to, during a first lap of the vehicle around a track, identify a portion of the track corresponding to a correlation of velocity, throttle position, and steering angle values indicative of a maximum power threshold, and, during a second lap, responsive to approaching the portion, limit power output by the powertrain causing temperature of the powertrain to fall and, upon entering the portion, increase power output to the maximum power threshold causing the temperature to rise, such that a difference in temperature between initiation of the limiting and exiting of the portion approaches zero.

15 Claims, 7 Drawing Sheets

(56) References Cited

U.S. PATENT DOCUMENTS

| | | | | |
|---|---|---|---|---|
| 10,118,606 B2* | 11/2018 | Ogawa | ................ | B60W 20/14 |
| 10,137,880 B2* | 11/2018 | Ogawa | ................ | B60W 20/14 |
| 10,196,054 B2* | 2/2019 | Colavincenzo | ......... | B60L 50/15 |
| 10,259,449 B2* | 4/2019 | Adam | ................ | B60K 6/48 |
| 10,315,641 B2* | 6/2019 | Kato | ................ | B60W 10/06 |
| 10,392,003 B2* | 8/2019 | Hawley | ................ | B60K 6/485 |
| 10,435,007 B2* | 10/2019 | Follen | ................ | B60W 50/0097 |
| 10,493,862 B2* | 12/2019 | Basler | ................ | B60W 20/13 |
| 10,556,497 B2* | 2/2020 | Zhang | ................ | B60K 6/48 |
| 10,618,512 B2* | 4/2020 | Hawley | ................ | B60W 10/08 |
| 10,640,112 B2* | 5/2020 | O Meachair | ......... | B60W 30/18 |
| 10,843,680 B2* | 11/2020 | Peterson | ................ | B60W 20/12 |
| 10,931,124 B2* | 2/2021 | Sherback | ................ | B60L 58/26 |
| 11,007,897 B2* | 5/2021 | Nakao | ................ | G01R 31/392 |
| 11,084,395 B2* | 8/2021 | Shin | ................ | B60L 7/10 |
| 11,247,552 B2* | 2/2022 | Follen | ................ | B60W 20/12 |
| 2006/0278449 A1* | 12/2006 | Torre-Bueno | ............ | B60K 6/46 |
| | | | | 180/65.29 |
| 2010/0019718 A1* | 1/2010 | Salasoo | ................ | B60L 58/15 |
| | | | | 320/128 |
| 2010/0188043 A1* | 7/2010 | Kelty | ................ | B60L 58/16 |
| | | | | 320/109 |
| 2011/0022255 A1* | 1/2011 | Yamada | ................ | B60K 6/46 |
| | | | | 180/65.265 |
| 2011/0196557 A1* | 8/2011 | Hennings | ............ | B60W 10/08 |
| | | | | 903/903 |
| 2011/0246011 A1* | 10/2011 | Meyer-Ebeling | ..... | B60W 10/08 |
| | | | | 903/903 |
| 2012/0035795 A1* | 2/2012 | Yu | ................ | B60W 50/0097 |
| | | | | 180/65.265 |
| 2012/0323413 A1* | 12/2012 | Kedar-Dongarkar | ....................... | |
| | | | | B60W 10/08 |
| | | | | 180/65.265 |
| 2013/0024060 A1* | 1/2013 | Sukkarie | ................ | H04L 67/12 |
| | | | | 701/22 |
| 2013/0095453 A1* | 4/2013 | Byrne | ................ | G09B 9/00 |
| | | | | 434/66 |
| 2013/0274952 A1* | 10/2013 | Weslati | ................ | B60W 40/02 |
| | | | | 701/1 |
| 2014/0046518 A1* | 2/2014 | Roos | ................ | B60W 50/082 |
| | | | | 903/902 |
| 2015/0073637 A1* | 3/2015 | Lennevi | ............ | B60W 50/0097 |
| | | | | 701/22 |
| 2015/0097512 A1* | 4/2015 | Li | ................ | B60L 58/13 |
| | | | | 320/108 |
| 2015/0274028 A1* | 10/2015 | Payne | ................ | B60L 53/00 |
| | | | | 903/903 |
| 2015/0274030 A1* | 10/2015 | Payne | ................ | G01C 21/3461 |
| | | | | 903/903 |
| 2015/0336458 A1* | 11/2015 | Lee | ................ | B60L 7/18 |
| | | | | 701/70 |
| 2016/0137185 A1* | 5/2016 | Morisaki | ................ | B60L 50/16 |
| | | | | 180/65.265 |
| 2016/0325637 A1* | 11/2016 | Payne | ................ | B60L 50/16 |
| 2017/0021730 A1* | 1/2017 | Ogawa | ................ | B60L 7/18 |
| 2017/0028980 A1* | 2/2017 | Ogawa | ................ | B60W 20/12 |
| 2017/0028981 A1* | 2/2017 | Ogawa | ................ | B60K 6/445 |
| 2017/0088117 A1* | 3/2017 | Ogawa | ................ | B60L 58/15 |
| 2017/0349167 A1* | 12/2017 | Fahland | ................ | B60W 10/22 |
| 2017/0355358 A1* | 12/2017 | Ogawa | ................ | B60W 10/00 |
| 2018/0134274 A1* | 5/2018 | Ogawa | ................ | B60W 10/06 |
| 2018/0201250 A1* | 7/2018 | D'Amato | ............ | B60W 10/06 |
| 2018/0222467 A1* | 8/2018 | Kaun | ................ | B60W 10/06 |
| 2019/0210591 A1* | 7/2019 | Low | ................ | B60W 50/085 |
| 2019/0303759 A1* | 10/2019 | Farabet | ................ | G06N 3/063 |
| 2020/0161874 A1* | 5/2020 | Ito | ................ | H02J 7/007 |
| 2020/0339109 A1* | 10/2020 | Hong | ................ | B60W 60/0011 |
| 2021/0294944 A1* | 9/2021 | Nassar | ................ | G06N 5/022 |

\* cited by examiner

LAP LEARNING FOR VEHICLE ENERGY MANAGEMENT OPTIMIZATION

TECHNICAL FIELD

The present disclosure relates to systems and methods for optimizing, vehicle energy management using lap learning.

BACKGROUND

Vehicles may include one or more sources of propulsion power, such as an internal combustion engine (ICE), one or more electric motors, a rechargeable traction battery, or some combination thereof. The term "electric vehicle" can be used to describe vehicles having at least one electric motor for vehicle propulsion, such as battery electric vehicles (BEV) and hybrid electric vehicles (HEV). A BEV includes at least one electric motor, wherein the energy source for the motor is a battery that is rechargeable from an external electric grid. An HEV includes an internal combustion engine and one or more electric motors, wherein the energy source for the engine is fuel and the energy source for the motors is a battery. The HEV battery may be a larger capacity battery that is rechargeable from the external electric grid and may serve as the main source of energy for vehicle propulsion until the battery depletes to a low energy level, at which time the HEV may at least partly rely on the internal combustion engine for vehicle propulsion.

SUMMARY

A system for a vehicle includes a powertrain configured to propel the vehicle, and a controller configured to, during a first lap of the vehicle around a track, identify a portion of the track corresponding to a correlation of velocity, throttle position, and steering angle values indicative of a maximum power threshold, and, during a second lap, responsive to approaching the portion, limit power output by the powertrain causing temperature of the powertrain to fall and, upon entering the portion, increase power output to the maximum power threshold causing the temperature to rise, such that a difference in temperature between initiation of the limiting and exiting of the portion approaches zero.

A method for a vehicle includes increasing, by a controller, power output by a powertrain to propel the vehicle to a maximum power threshold greater than a continuous power threshold responsive to entering a portion of a track previously-associated with a correlation of velocity being greater than 80% of a maximum velocity achieved on the track, throttle position approaching 100%, and steering angle approaching zero degrees.

A powertrain for a vehicle includes a power source configured to propel the vehicle, and a controller configured to, during a first lap of a track, operate the source to output a first power threshold while traveling a portion of the track having a predefined correlation of velocity, throttle position, and steering angle, and, responsive to entering the portion during a second lap, operate the source to output a second power threshold greater than the first while traveling the portion.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrified powertrains may operate at a maximum regenerative power, $P_{max\_regen}$ and maximum output power, $P_{max\_out}$ that are greater than a continuous regenerative power, $P_{max\_regen}$ and continuous output power, $P_{cont\_out}$, respectively. In some instances, the electrified powertrain may operate at the maximum power levels, $P_{max\_regen}$ and $P_{max\_out}$ for short amounts of time without overheating the components of the vehicle, but those brief amounts of time are complex to identify. The current solution is to operate an electrified powertrain conservatively, such that powertrains in vehicles manufactured for general use may be configured to operate under static power limits and prevent operation at a maximum regenerative power, $P_{max\_regen}$ and maximum output power, $P_{max\_out}$, except in very rare instances. An intelligent energy management system may support vehicle performance improvement to increase customer satisfaction.

Amount of time at which the vehicle completes one lap around a track may dependent upon the applied energy management strategy. One or more powertrain static power limits may prevent optimization of energy use under many vehicle operating conditions. Customers of production performance vehicles are always interested in better performance, and they are especially sensitive to range and track durability sacrifices associated with switching from combustion engines to electric motor propulsion. In one example, an algorithm may be implemented for optimizing the energy management strategy as a production vehicle drives around a track, such as increasing fuel economy, decreasing lap time, increasing continuous track driving time, and so on.

The algorithm may include operating the vehicle during a first (reconnaissance) lap such that the vehicle systems capture a change over time in vehicle speed and steering angle throughout the entire distance of the lap. For example, during the first lap, the vehicle may monitor and periodically capture speedometer, e.g., via a wheel speed sensor, and steering wheel angle traces as functions of distance. The vehicle global positioning system (GPS) may capture and store geographic coordinates indicating starting and finishing positions of the first lap.

The algorithm may further include using the captured vehicle speed and steering angle as functions of distance to enhanced energy regeneration. For example, when a vehicle is traveling down a straightaway, i.e., high speed, very low steering angle, the algorithm may identify a distance at the end of the straightaway where a continued acceleration may provide low benefit to a lap time of the vehicle. As another example, the algorithm may optimize vehicle operation on a straight section of the track that lies between two consecutive low-speed corners by decreasing or limiting available power between the turns. In some instances, the vehicle may be configured to operate the powertrain by gradually increasing and decreasing available regenerative power, $P_{avail\_regen}$ and available output power, $P_{avail\_out}$ to avoid surprising the driver. The algorithm may use the traces of vehicle speed (and acceleration) and distance to calculate estimates of the amount of additional regeneration potential gained by opportunistically applying these peak power limits—quantified in units of energy (Watt-hours).

The algorithm may selectively increase powertrain energy usage, such as by temporarily increasing available output power, $P_{avail\_out}$ when a vehicle is coming out of a turn, at a low speed and the driver demands high acceleration at the beginning of a long straightaway. Applying dynamic available output and regenerative power values may result in a faster lap time as compared to operating a vehicle with a static power limit. The optimized energy usage may also extend an energy range of the traction battery and increase vehicle track-driving range, e.g., support longer track-driving sessions.

Figure 1:
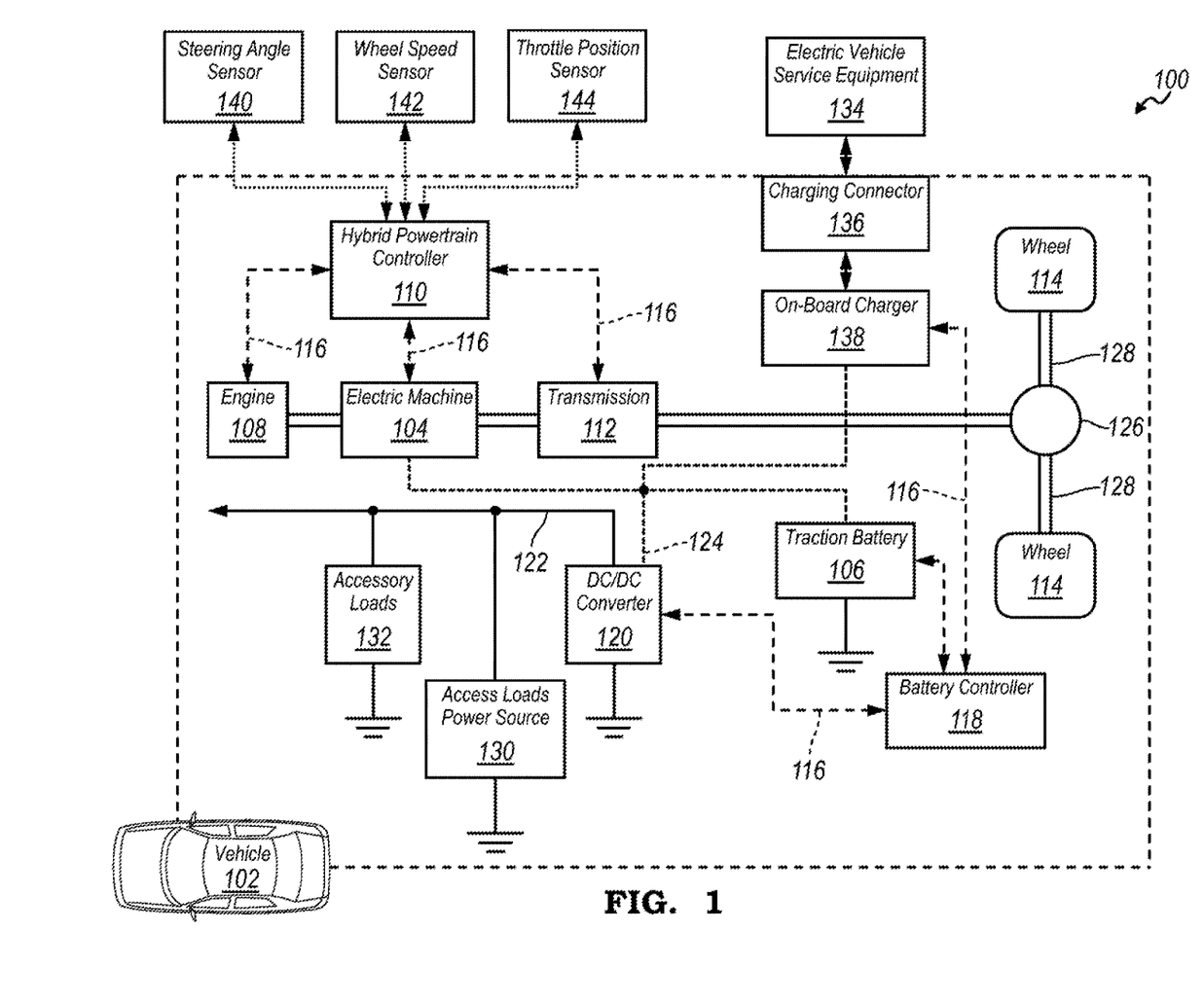
FIG. 1 is a block diagram of a plug-in hybrid electric vehicle (PHEV) illustrating a typical drivetrain and energy storage components.

FIG. 1 illustrates an example power distribution system 100 for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller (hereinafter, the powertrain controller) 110 configured to monitor and control 116 operation of one or more components of the vehicle 102, such as, but not limited to, the engine 108 and the transmission 112.

The powertrain controller 110 may be further configured to receive signals from a plurality of vehicle sensors, such as, but not limited to, a steering angle sensor 140, a wheel speed sensor 142, and a throttle position sensor 144. The powertrain controller 110 that monitors and controls operation of the electric machine 104, the engine 108, and the transmission 112 may receive, from a plurality of sensors, such as sensors 140, 142, 144, and others, signals indicative of current engine and motor rotational speed, current operating and coolant temperature, power, current, voltage, flux, torque, vibration, duty cycle, and specific fuel consumption, as well as, misalignment of motor winding and so on.

Examples of the vehicle 102 sensors include thermocouples, resistance temperature detectors, rotary or linear potentiometers, and hall effect sensors, such as, but not limited to, an air-fuel ratio sensor that monitors and reports air-fuel ratio of the engine 108, an engine speed sensor that monitors and reports engine speed, a throttle position sensor that monitors and report position of an engine throttle, a crank position sensor that monitors and reports a top dead center (TDC) position of engine pistons, a cam position sensor that monitors and reports position of engine valves, a knock sensor and detects engine knock due to timing advance, an engine coolant temperature sensor that measures the engine temperature, a manifold absolute pressure (MAP) sensor that regulates fuel metering, a mass air flow (MAF) sensor that monitors and reports the mass of air entering the engine 108, an oxygen sensor that monitors the amount of oxygen in the exhaust, a fuel pressure sensor that measures pressure in the fuel system, a wheel speed sensor that measures and reports the speed of the vehicle 102, and an accelerometer that measures and reports frequency spectrum of electric machine 104 vibrations.

The powertrain controller 110 may include one or more processors connected with both a memory and a computer-readable storage medium and configured to perform instructions, commands, and other routines in support of the processes described herein. For instance, the powertrain controller 110 may be configured to execute instructions of vehicle applications to provide features, such as, but not limited to, changing available regenerative and output power based on a position of the vehicle 102. Such instructions and other data may be maintained in a non-volatile manner using a variety of types of computer-readable storage medium of the powertrain controller 110. An example of the computer-readable medium (also referred to as a processor-readable medium or storage) includes any non-transitory (e.g., tangible) medium that participates in providing instructions or other data that may be read by the processor of the powertrain controller 110. Computer-executable instructions may be compiled or interpreted from computer programs created using a variety of programming languages and/or technologies including, without limitation and either alone or in combination, Java, C, C++, C#, Objective C, Fortran, Pascal, Java Script, Python, Perl, and PL/SQL.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. In some instances, the traction battery 106 may comprise a plurality of battery cells (not illustrated), e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the traction battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the powertrain controller 110 and may command to charge and discharge the traction battery 106 responsive to one or more signals from the powertrain controller 110. In some examples, the powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media-oriented system transfer (MOST), as some examples.

The battery controller 118 may be further configured to receive signals from a plurality of vehicle 102 sensors (not illustrated), such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 of a charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, the Chinese GB/T 27930, GB/T 18487.1, GB/T 20234.1, GB/T 20234.2, GB/T 20234.3 and so on. In one example, the recesses of the charging connector 136 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more compressors and electric heaters, that operate using voltages greater than 50V.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the powertrain controller 110. In some instances, the low voltage subsystems or components electrically connected with one another and with other portions of the vehicle 102 electrical distribution network via the low voltage connection 122 may be generally referred to as a low voltage bus.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 during ignition off and/or engine oil states.

Figure 2A:
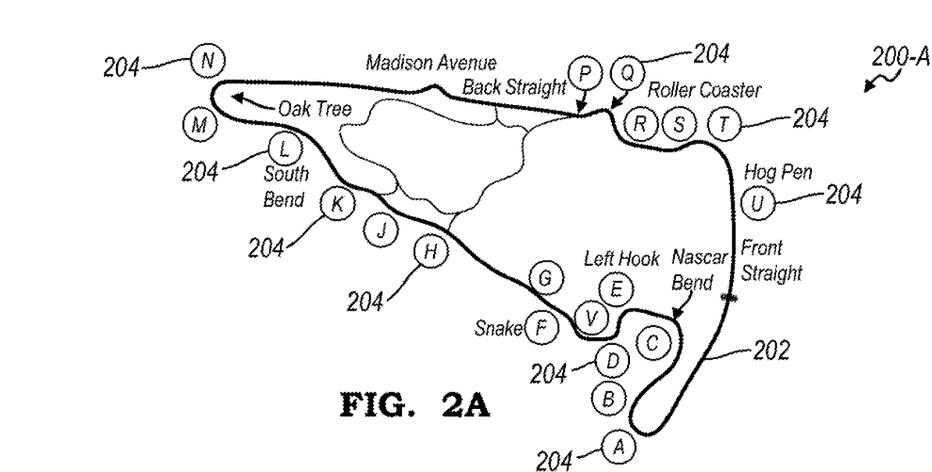
FIG. 2A is a block diagram illustrating an example race track.

FIG. 2A illustrates an example block diagram 200-A of a race track 202 including a plurality of track portions 204. Examples of track portion 204 may include roadway features, such as curves, bends, slopes, hills, ramps, blinds, straightaways, and so on. Each track portion 204 may be described using an absolute position, a relative position, a geographic location, latitude and longitude, elevation, and altitude, in one or more coordinate systems, and may be further analyzed as having one or more beginning and end points, length, elevation gain and loss, and other parameters. Moreover, the portions 204 may wholly or partially overlap with one another, such that a beginning and/or ending point of one portion 204 may be between respective beginning and ending points of another portion 204 and so on. Furthermore, corresponding roadway profiles of the portions 204 may be similar or different from one another and may be analyzed separately, together, or in various other combinations of equal or different groups or subgroups. Still further, the portions 204 located geographically next to or near one another may be analyzed together or separately with and without consideration to a direction of travel.

Depending on respective defining characteristics, each track portion 204 may require same or different speed, acceleration pedal position, brake pedal position, steering angle, throttle control, and other vehicle 102 handling and operating parameter values. Further, amount of time at which the vehicle 102 completes one lap around the track 202 may dependent on the speed, acceleration, deceleration, braking, steering angle, throttle control, and other handling and operating parameters at which the vehicle 102 is operated. The handling and operating parameters of the vehicle 102 may be controlled by the operator of the vehicle 102, established via an energy management strategy, or some combination of both. Additional or alternative strategies may be implemented, such as, strategies targeting improved fuel economy, energy management, drivability, handling aggressiveness, system durability and longevity, lap time, and other performance metrics.

Figure 2B:
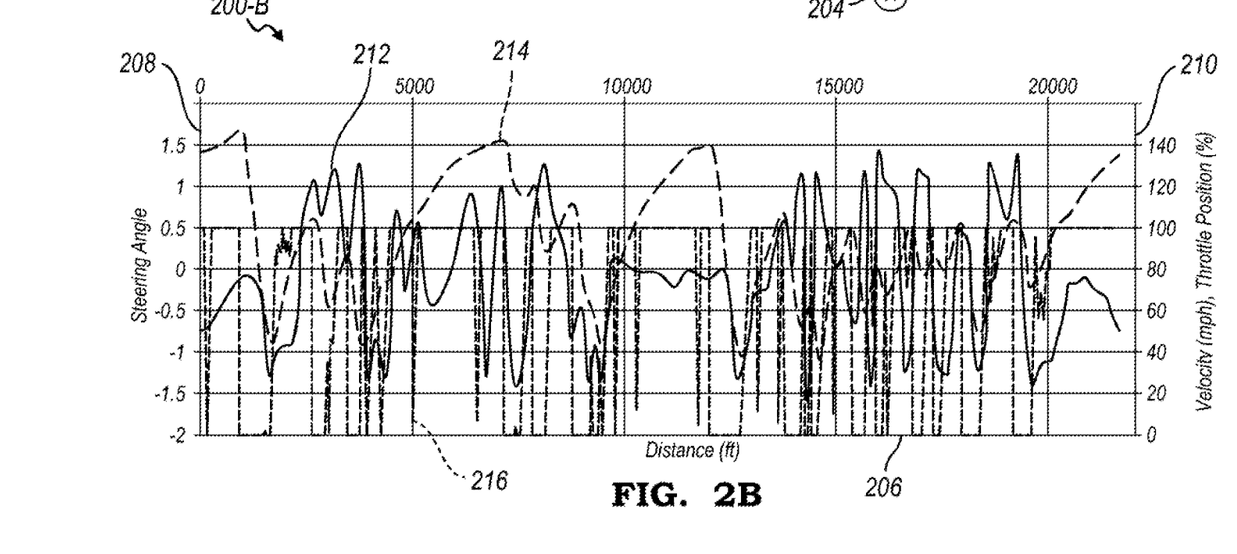
FIG. 2B is a graph illustrating vehicle operating parameters for an entire length of the track during a first lap.

FIG. 2B illustrates an example diagram 200-B of changes in operating parameters of the vehicle 102 during a first lap around a given track 202. Specifically, the diagram 200-B includes horizontal axis 206 that illustrates distance the vehicle 102 travelled along the track 202. A first vertical axis 208 of the diagram 200-B illustrates steering angle parameter values and a second vertical axis 210 illustrates velocity and throttle position parameter values. Thus, the diagram 200-B includes relative values of steering angle 212, velocity 214, and throttle position 216 of the vehicle 102 with respect to distance along the track 202.

The powertrain controller 110 may be configured to monitor and control operation of the vehicle 102 during the first lap, including controlling one or more of the steering angle, velocity, and throttle position. During the first lap, the powertrain controller 110 may further detect a geographic location (e.g., geographic coordinates) of the vehicle 102 and/or relative position of the vehicle 102 along the length of the track 202, such that the captured values of steering angle, velocity, throttle position, and other parameters may be related to the position of the vehicle 102 on the track 202.

The powertrain controller 110 may be configured to operate one or more components, e.g., the electric machine 104, the traction battery 106, the engine 108, the converter 120, and so on, of the vehicle 102 at a maximum regenerative power, $P_{max\_regen}$ and maximum output power, $P_{max\_out}$ that are greater than a continuous regenerative power, $P_{cont\_regen}$ and continuous output power, $P_{cont\_out}$, respectively. In some instances, the powertrain controller 110 may operate the vehicle 102 at the maximum power levels, $P_{max\_regen}$ and $P_{max\_out}$ at predefined portions 204 of the track 202. For example, during a first lap of the vehicle 102 around the track 202, the powertrain controller 110 may be configured to identify one or more portions 204 of the track 202 at which to operate the vehicle 102 at the maximum power levels, $P_{max\_regen}$ and $P_{max\_out}$ for predefined amounts of time without overheating the components of the vehicle 102. As another example, during a second lap of the vehicle 102 around the track 202, the powertrain controller 110 may be configured to apply an improved energy management strategy when the vehicle 102 is traveling through the identified portions 204 of the track 202 to operate the vehicle 102 at the maximum power levels, $P_{max\_regen}$ and $P_{max\_out}$ for predefined amounts of time, such that a first time, $t_1$ to complete the first lap around the track 202 is greater than a second time, $t_2$ to complete the second lap around the track 202.

In one example, an algorithm may be implemented for optimizing the energy management strategy as a production vehicle drives around a track, such as increasing fuel economy, decreasing lap time, increasing continuous track driving time, and so on.

Figures 3A, 3B, 3C:
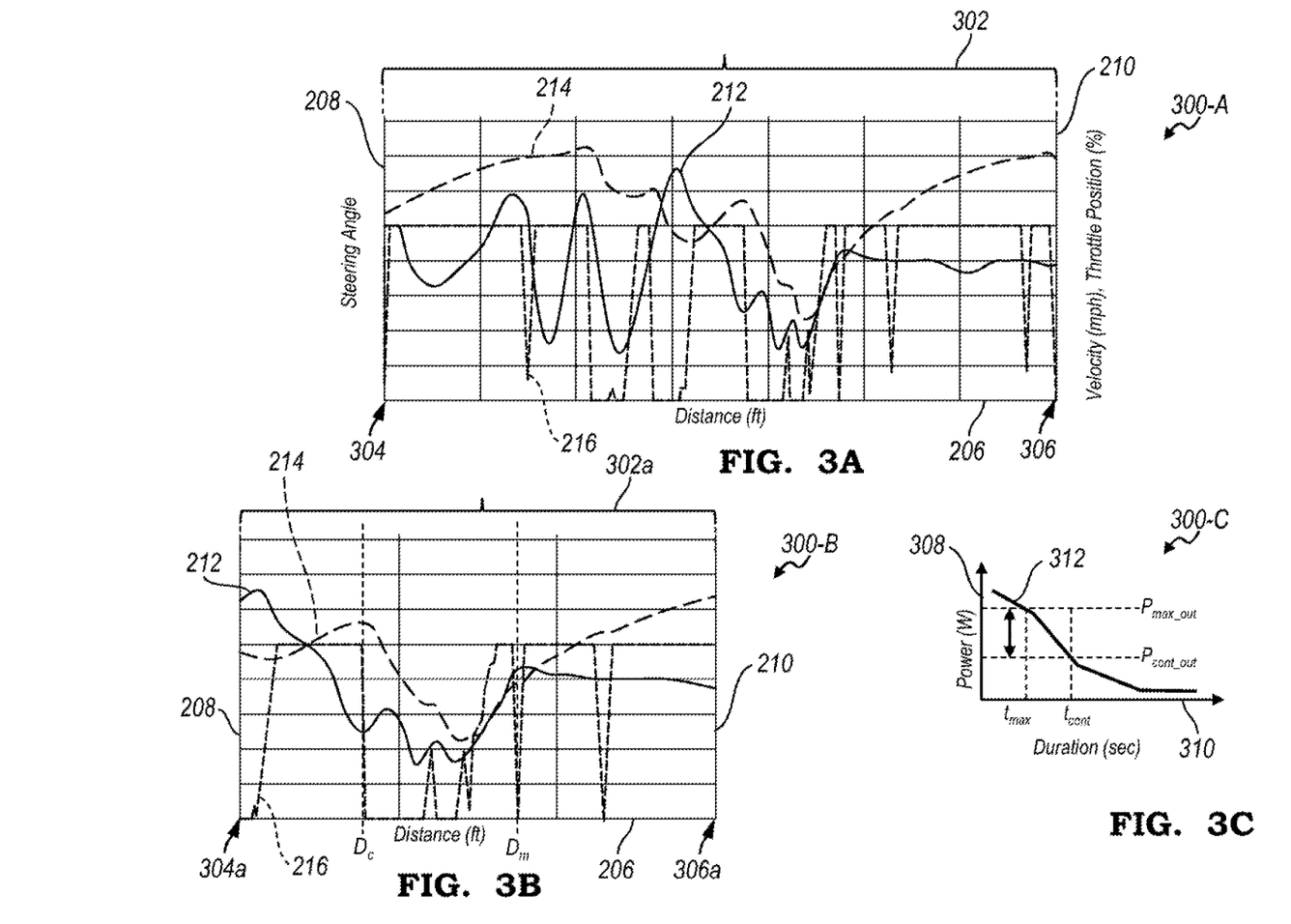
FIGS. 3A-3B are graph illustrating the operating parameters while traveling portions of the track during the first lap.
FIG. 3C is a graph illustrating output power of a powertrain with respect to a duration of time.

FIG. 3A illustrates an example diagram 300-A of changes in operating parameters of the vehicle 102 on a first length 302 during a first lap around a given track 202. The first length 302 may extend along a length of the track 202 and between a beginning point 304 and an ending point 306. The beginning and ending points 304, 306 of the first length 302 may be described using absolute position parameters, relative position parameters, or some combination thereof. For instance, each of the beginning and ending points 304, 306 may be described using geographic coordinates, distance from a predefined starting position, e.g., START, and a predefined finishing position, e.g., FINISH, of the track 202, and so on.

Accordingly, while moving in a first direction of travel, the vehicle 102 may enter the first length 302 of the track 202 at a geographic location corresponding to the beginning point 304 and may exit the first length 302 of the track 202 at a geographic location corresponding to the ending point 306. While a geographic location corresponding to the point 304 is described as a beginning of the first length 302 and a geographic location corresponding to the point 306 is described as an ending of the first length 302, other variations are also contemplated. For instance, while moving in a second direction of travel opposite the first direction, the vehicle 102 may enter the first length 302 of the track 202 at a geographic location corresponding to the ending point 306 and may exit the first length 302 of the track 202 at a geographic location corresponding to the beginning point 304, and so on. Notably, traveling in the second direction opposite the first direction along a same length of the track 202 may present same or different roadway profile, such that energy management strategy of the vehicle 102 may be adjusted according thereto.

While the vehicle 102 is traveling the first length 302 of the track 202 during a first lap, the powertrain controller 110 may be configured to detect relative values of steering angle 212, velocity 214, and throttle position 216 of the vehicle 102. Based on the detected values of steering angle 212, velocity 214, and throttle position 216, the powertrain controller 110 may determine that an additional power burst may be applied when the vehicle 102 is traveling the first length 302 of the track 202.

In one example, the powertrain controller 110 may determine that, while the vehicle 102 travels at least a portion of the first length 302 of the track 202, a low steering angle 212 of the vehicle 102 corresponds to low to medium vehicle velocity 214, e.g., less than or equal to 80 miles per hour (mph), and corresponds to a wide-open vehicle 102 throttle position 216, such that a roadway profile of the first length 302 may be indicative of a straightaway. In response to detecting, during a first lap, that at least a portion of the first length 302 of the track 202 is a straightaway, the powertrain controller 110 may be configured to associate the first length 302 with the maximum output power, $P_{max\_out}$ of the energy management system.

Furthermore, during a second lap around a same track 202, the powertrain controller 110 may, upon approaching the first length 302 of the track 202, increase available output power from the continuous output power, $P_{cont\_out}$ to the maximum output power, $P_{max\_out}$. For instance, the powertrain controller 110 may, during a second lap, increase available output power from the continuous output power, $P_{cont\_out}$ to the maximum output power, $P_{max\_out}$, responsive to detecting that the vehicle 102 is approaching the beginning point 304 of the first length 302, and may decrease available output power to correspond to the continuous output power, $P_{cont\_out}$ responsive to detecting that the vehicle 102 is approaching the ending point 306 of the first length 302. Other considerations for enabling and disabling the maximum output power, $P_{max\_out}$ are also contemplated.

FIG. 3C illustrates an example power distribution profile 300-C for the vehicle 102. The graph 300-C includes a vertical axis 308 indicative of available output power and a horizontal axis 310 indicative of an amount of time, e.g., duration, a given level of output power may be sustained. Accordingly, a curve 312 illustrates a change in available output power of the vehicle 102 with respect to a time duration. As one example, the maximum output power, $P_{max\_out}$ may be sustained by the vehicle 102 for a first duration of time, $t_{max}$ and the continuous output power, $P_{cont\_out}$ may be sustained by the vehicle 102 for a second duration of time, $t_{cont}$, where the maximum output power, $P_{max\_out}$ is greater than the continuous output power, $P_{cont\_out}$ and the second duration of time, $t_{cont}$ is greater than the first duration of time, $t_{max}$.

In some instances, a length of time in which the vehicle 102 travels the entirety of the first length 302 may be greater than the first duration of time, $t_{max}$ associated with the maximum output power, $P_{max\_out}$. Accordingly, the powertrain controller 110 may vary, based on a corresponding duration of time, t, available output power of the vehicle 102 between the maximum output power, $P_{max\_out}$ and the continuous output power, $P_{cont\_out}$ while the vehicle 102 is traveling the first length 302 of the track 202.

For instance, illustrated in FIG. 3B is an example vehicle operating parameters distribution graph 300-B of the steering angle, velocity, and throttle position along the first length 302a indicative of a portion of the first length 302 of FIG. 3A. For example, each of the beginning and ending points 304a, 306a defining the first length 302a may be between and closest to a corresponding one of the beginning and ending points 304, 306 defining the first length 302.

Accordingly, during a first lap, the powertrain controller 110 may identify, based on the correlation of the steering angle, velocity, and throttle position, a distance where the vehicle 102 may operate using the maximum output power, $P_{max\_out}$, e.g., the distance immediately following a point $D_m$. Further, during a first lap, the powertrain controller 110 may identify, based on the correlation of the steering angle, velocity, and throttle position, a distance immediately prior to the point $D_m$ where the vehicle 102 may operate using the continuous output power, $P_{cont\_out}$, e.g., the distance between the points $D_c$ and $D_m$. In some instances, the distance between the points $D_c$ and $D_m$ may be less than or equal to the distance traveled during the second duration of time, $t_{cont}$.

During a second lap around a same track 202, the powertrain controller 110 may operate the vehicle 102, such that available output power corresponds to the continuous output power, $P_{cont\_out}$ prior to reaching the point the point $D_m$ and/or for a period of time less than or equal to the second duration of time, $t_{cont}$. Further, during a second lap, the powertrain controller 110 may increase available output power from the continuous output power, $P_{cont\_out}$ to the maximum output power, $P_{max\_out}$ when the vehicle 102 reaches and/or passes point $D_m$ of the first length 302a. Still further, the powertrain controller 110 may decrease available output power from the maximum output power, $P_{max\_out}$ to the continuous output power, $P_{cont\_out}$ responsive to the time elapsed while operating at or about the maximum output power, $P_{max\_out}$ being greater than the first duration of time, $t_{max}$.

Figure 4A:
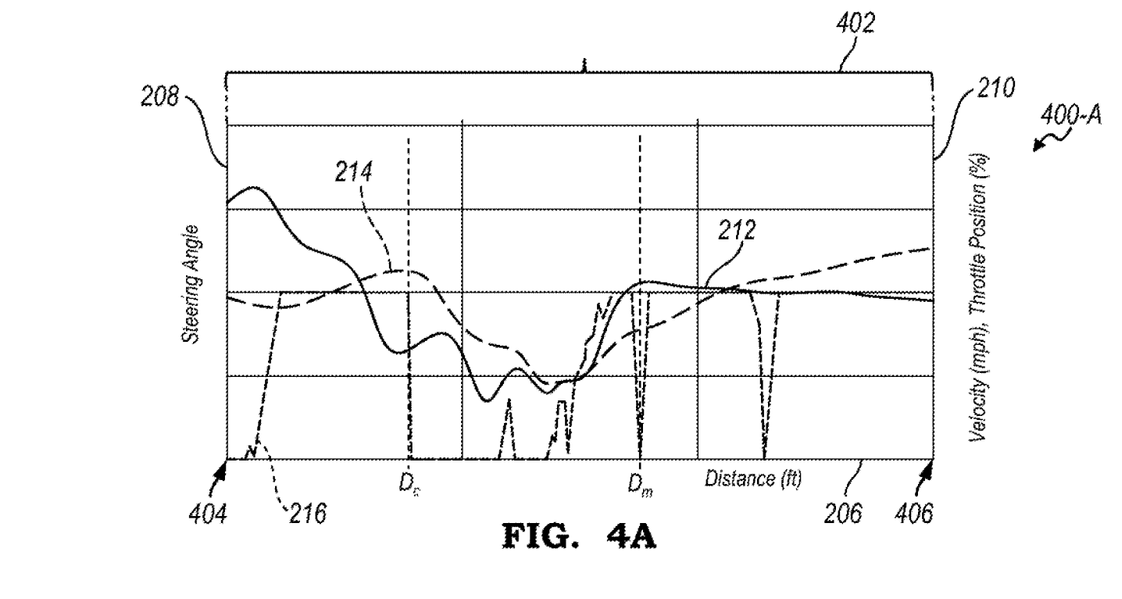
FIG. 4A is a graph illustrating the operating parameters while traveling a portion of the track during the first lap.

FIG. 4A illustrates an example diagram 400-A of changes in operating parameters of the vehicle 102 on a track length 402 during a first lap around a given track 202. The first length 302 may extend along a length of the track 202 and between a beginning point 404 and an ending point 406. The beginning and ending points 404, 406 of the track length 402 may be described using absolute position parameters, relative position parameters, or some combination thereof. For instance, each of the beginning and ending points 404, 406 may be described using geographic coordinates, distance from a predefined starting position, e.g., START, and a predefined finishing position, e.g., FINISH, of the track 202, and so on.

Accordingly, while moving in a first direction of travel, the vehicle 102 may enter the track length 402 of the track 202 at a geographic location corresponding to the beginning point 404 and may exit the track length 402 of the track 202 at a geographic location corresponding to the ending point 306. While a geographic location corresponding to the point 304 is described as a beginning of the track length 402 and a geographic location corresponding to the point 306 is described as an ending of the track length 402, other variations are also contemplated. For instance, while moving in a second direction of travel opposite the first direction, the vehicle 102 may enter the track length 402 of the track 202 at a geographic location corresponding to the ending point 406 and may exit the track length 402 of the track 202 at a geographic location corresponding to the beginning point 404, and so on. Notably, traveling in the second direction opposite the first direction along a same length of the track 202 may present same or different roadway profile, such that energy management strategy of the vehicle 102 may be adjusted according thereto.

While the vehicle 102 is traveling the track length 402 of the track 202 during a first lap, the powertrain controller 110 may be configured to detect relative values of steering angle 212, velocity 214, and throttle position 216 of the vehicle 102. Based on the detected values of steering angle 212, velocity 214, and throttle position 216, the powertrain controller 110 may determine that a preparation for an additional power burst may be applied when the vehicle 102 is traveling the track length 402 of the track 202. In some instances, the preparation output power, $P_{prep\_out}$ may be less than the continuous output power, $P_{cont\_out}$. Accordingly, during a second lap around a same track 202, the powertrain controller 110 may vary available output power among one or more of the preparation output power, $P_{prep\_out}$, the continuous output power, $P_{cont\_out}$, and the maximum output power, $P_{max\_out}$.

In one example, the powertrain controller 110 may determine that, when the vehicle 102 travels passed the point $D_m$ of the track length 402 of the track 202, a low steering angle 212 of the vehicle 102 corresponds to low to medium vehicle velocity 214, e.g., less than or equal to 80 mph, and corresponds to a wide-open vehicle 102 throttle position 216, thereby indicating that a roadway profile of the track length 402 passed the point $D_m$ may be a straightaway and the available output power may correspond to the maximum output power, $P_{max\_out}$. As another example, the powertrain controller 110 may determine that, when the vehicle 102 travels between the points $D_c$ and $D_m$ of the track length 402, the steering angle, vehicle speed, and throttle position indicate that the available output power may correspond to the continuous output power, $P_{cont\_out}$. As still another example, the powertrain controller 110 may determine that, immediately prior to reaching the point $D_c$ of the track length 402, the steering angle corresponds to the vehicle velocity and corresponds to the throttle position, such that the available output power may correspond to the preparation output power, $P_{prep\_out}$.

Figure 4B:
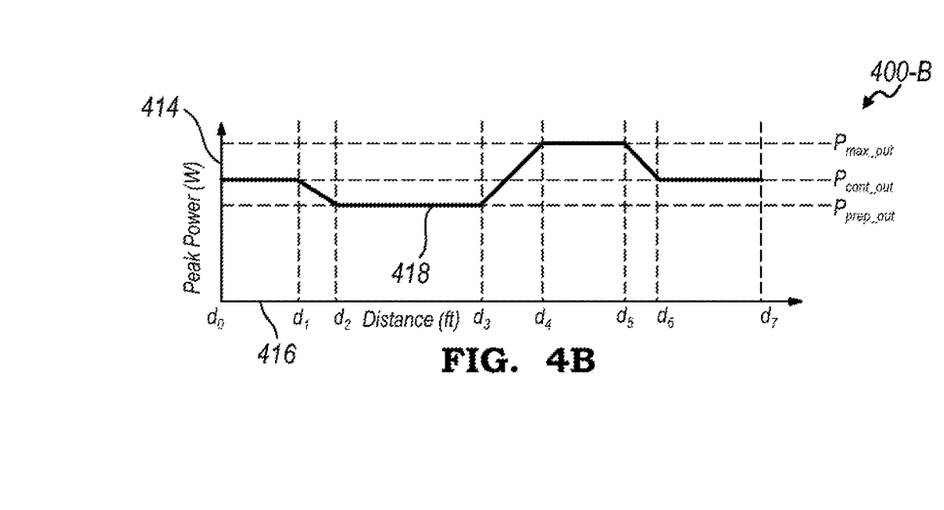
FIG. 4B is a graph illustrating powertrain peak power with respect to a vehicle location along the portion of FIG. 4A.
Figure 4C:
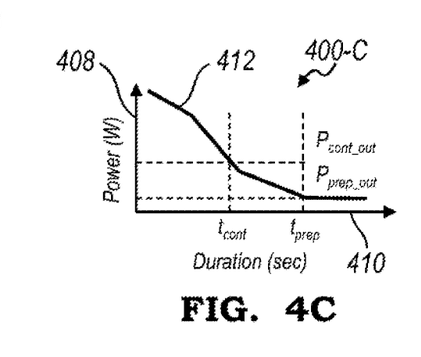
FIG. 4C is a graph illustrating output power with respect to a duration of time.

FIG. 4C illustrates an example power distribution profile 400-C for the vehicle 102. The graph 400-C includes a vertical axis 408 indicative of available output power and a horizontal axis 410 indicative of an amount of time, e.g., duration, a given level of output power may be sustained. Accordingly, a curve 412 illustrates a change in available output power of the vehicle 102 with respect to a time duration. As one example, the continuous output power, $P_{cont\_out}$ may be sustained by the vehicle 102 for the second duration of time, $t_{cont}$ and the preparation output power, $P_{prep\_out}$ may be sustained by the vehicle 102 for a third duration of time, $t_{max}$, where the preparation output power, $P_{prrp\_out}$ is less than the continuous output power. $P_{cont\_out}$ and the third duration of time, $t_{prep}$ is greater than the second duration of time, $t_{cont}$. Accordingly, the powertrain controller 110 may vary, based on a corresponding duration of time, t, available output power of the vehicle 102 between the maximum output power, $P_{max\_out}$, the continuous output power, $P_{cont\_out}$, and the preparation output power, $P_{prep\_out}$ while the vehicle 102 is traveling the track length 402 of the track 202.

FIG. 4B illustrates an example power distribution graph 400-B of available output power during a second lap, where a distance between points $d_0$ and $d_7$ corresponds to a portion of the track 202. In one example, the powertrain controller 110 may operate the vehicle 102 such that available output power corresponds to the continuous output power, $P_{cont\_out}$, prior to reaching the point $d_1$. Further, upon passing the point $d_1$ and prior to reaching the point $d_2$, the powertrain controller 110 may decrease the available output power to correspond to the preparation output power, $P_{prep\_out}$. The powertrain controller 110 may then operate the vehicle 102 such that the available output power is the preparation output power, $P_{prep\_out}$ while the vehicle 102 is between points $d_2$ and $d_3$.

As another example, the powertrain controller 110 may determine that, when the vehicle 102 passes the point $d_3$ and prior to reaching the point $d_4$, the powertrain controller 110 may increase the available output power from the preparation output power, $P_{prep\_out}$ to the maximum output power, $P_{max\_out}$. The powertrain controller 110 may then operate the vehicle 102 such that the available output power is the maximum output power, $P_{max\_out}$ while the vehicle 102 is between points $d_4$ and $d_5$.

As still another example, the powertrain controller 110 may determine that, when the vehicle 102 passes the point $d_5$ and prior to reaching the point $d_6$, the powertrain controller 110 may decrease the available output power from the maximum output power, $P_{max\_out}$ to the continuous output power, $P_{cont\_out}$. The powertrain controller 110 may then operate the vehicle 102 such that the available output power is the continuous output power, $P_{cont\_out}$ while the vehicle 102 is between points $d_6$ and $d_7$. As described in reference to at least FIGS. 3C and 4C, the powertrain controller 110 may vary or maintain the available output power of the vehicle 102 among the maximum output power, $P_{max\_out}$, the continuous output power, $P_{cont\_out}$, and the preparation output power, $P_{prep\_out}$ based on the first, second, and third time $t_{max}$, $t_{cont}$, and $t_{prep}$ associated with each output power level. Furthermore, one or more available output power levels described in reference to FIG. 4B may correspond to one or more available output power levels described in reference to FIG. 4A, such that the preparation output power, $P_{prep\_out}$ described with reference to the distance between the points $d_2$ and $d_3$ of FIG. 4B corresponds to the available output power of the vehicle 102 prior to reaching the point $D_c$ of FIG. 4A, the continuous output power, $P_{cont\_out}$ described with reference to the distance between the points $d_6$ and $d_7$ of FIG. 4B corresponds to the available output power of the vehicle 102 between the points $D_c$ and $D_m$ of FIG. 4A, so on. Other combinations of corresponding lengths (or segments) of the track 202 and available output power levels are also contemplated.

Figure 5:
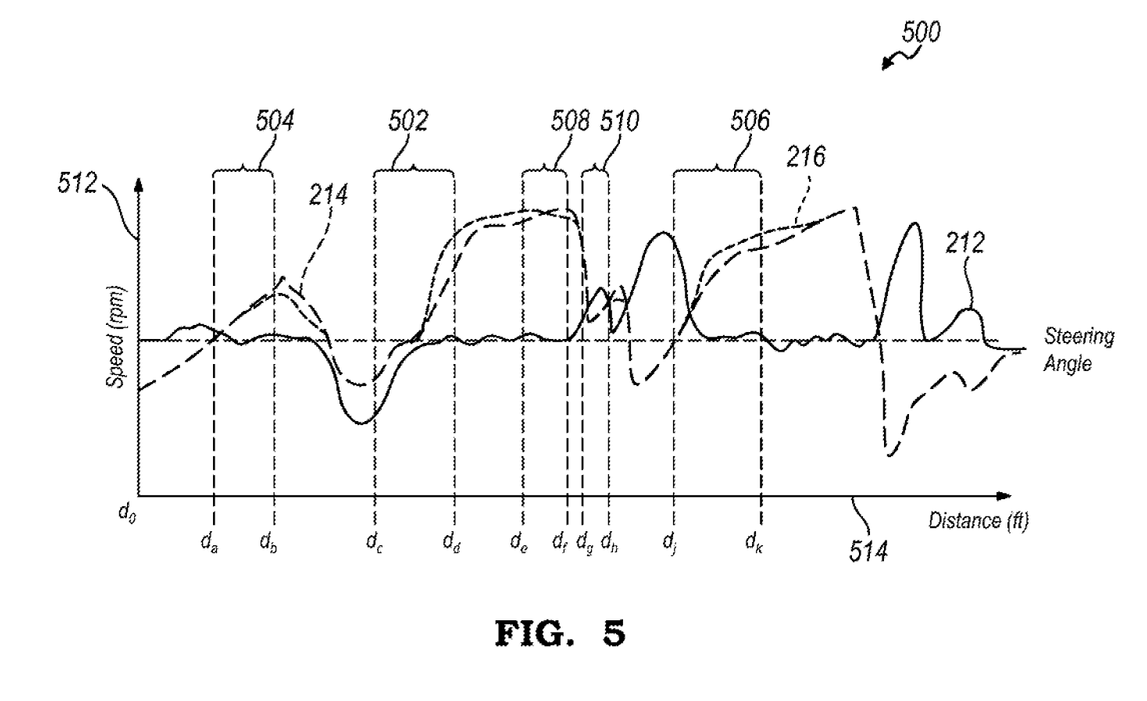
FIG. 5 is a graph illustrating the operating parameters during the first lap.

FIG. 5 illustrates an example graph 500 of changes in operating parameters of the vehicle 102 with respect to distance along the track 202 during a first lap. The graph 500 includes a first axis 512 indicative of wheel speed in revolutions per minute (rpm) and a second axis 514 indicative of distance along the track 202 in feet. Following completion of the first lap, the powertrain controller 110 may identify one or more segments of the track 202 where the correlation between corresponding values of steering angle 212, velocity 214, and throttle position 216, such that the available output power may correspond to the maximum output power, $P_{max\_out}$.

For example, the powertrain controller 110 may identify a first segment 502 of the track 202 between points $d_c$ and $d_d$ where a low steering angle 212 of the vehicle 102 corresponds to low-to-medium vehicle velocity 214 and corresponds to a wide-open vehicle 102 throttle position 216. The powertrain controller 110 may associate the first segment 502 of the track 202 as the segment at which the available output power may correspond to the maximum output power, $P_{max\_out}$.

Furthermore, the powertrain controller 110 may identify one or more segments of the track 202 preceding the first segment 502, such that the available output power may correspond to one of the continuous output power, $P_{cont\_out}$ and the preparation output power, $P_{prep\_out}$. As one example, the powertrain controller 110 may identify a second segment 504 of the track 202 between points $d_a$ and $d_b$ where a low steering angle 212 of the vehicle 102 corresponds to high vehicle velocity 214, e.g., greater than 80 mph, and corresponds to a wide-open vehicle 102 throttle position 216, such that the available output power may correspond to the preparation output power, $P_{prep\_out}$.

As another example, the powertrain controller 110 may identify a third segment 506 of the track 202 between points $d_j$ and $d_k$ where a low steering angle 212 of the vehicle 102 corresponds to low-to-medium vehicle velocity 214, e.g., less than or equal to 80 mph, and corresponds to a wide-open vehicle 102 throttle position 216, such that the available output power of the third segment 506 may correspond to the maximum output power, $P_{max\_out}$. Still further, the powertrain controller 110 may identify fourth and fifth segments 508, 510 of the track 202 between points $d_e$ and $d_f$ and points $d_g$ and $d_h$, respectively, where a low steering angle 212 of the vehicle 102 corresponds to high vehicle velocity 214, e.g., greater than 80 mph, and corresponds to a wide-open vehicle 102 throttle position 216, such that the available output power during the fourth and fifth segments 508, 510 may correspond to the preparation output power, $P_{prep\_out}$.

Figure 6:
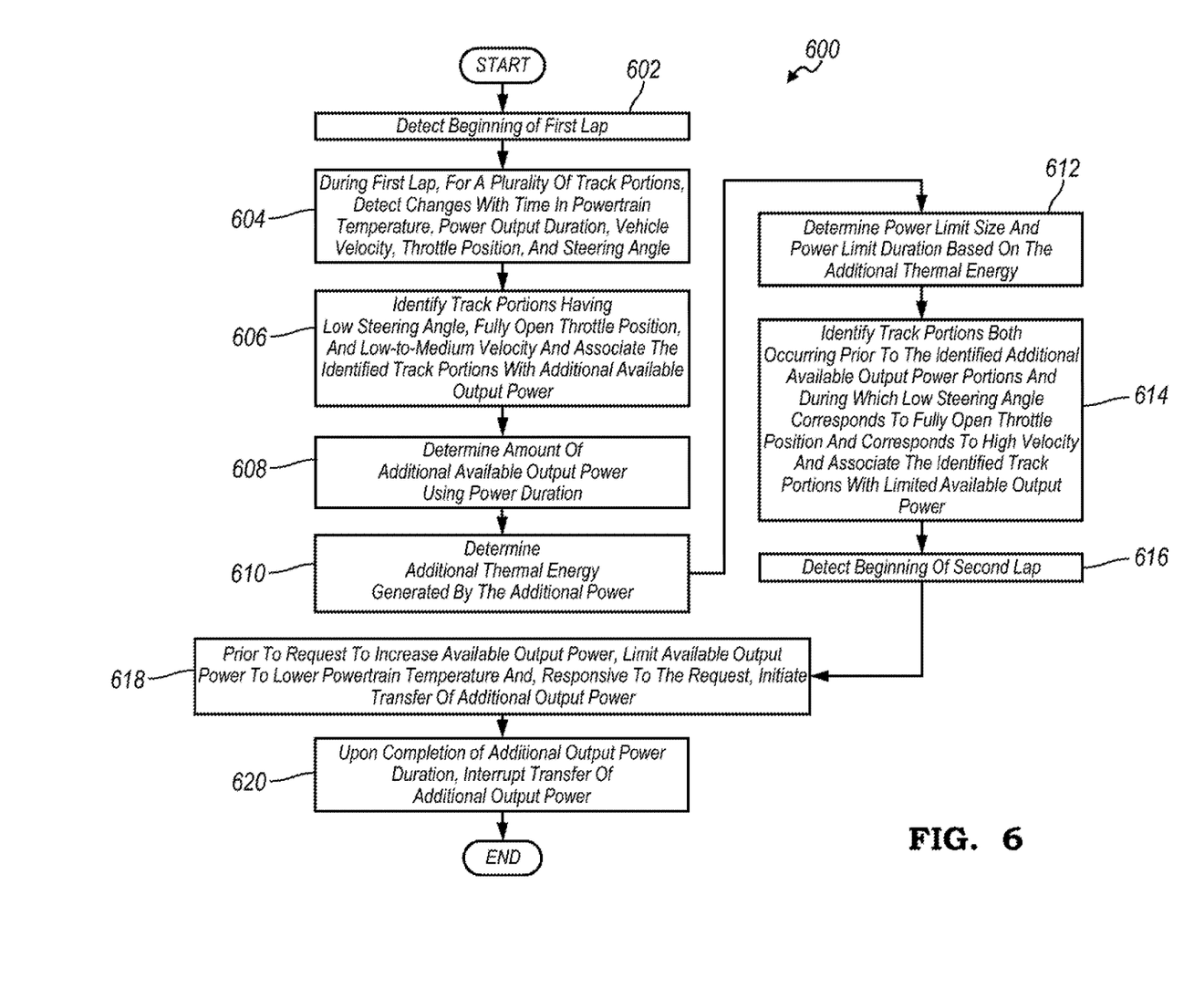
FIG. 6 is a flowchart illustrating an algorithm for increasing available output power during a second lap of the track.
Figure 7A:
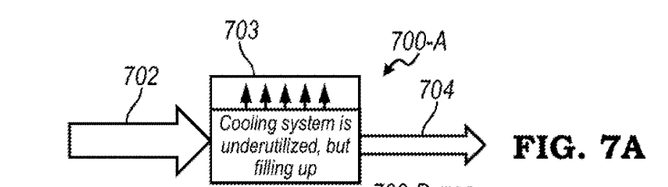
FIGS. 7A-7D are block diagrams illustrating an example thermal energy management strategy.
Figure 7B:
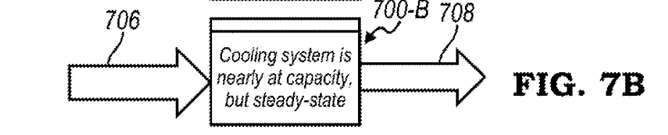
Figure 7C:
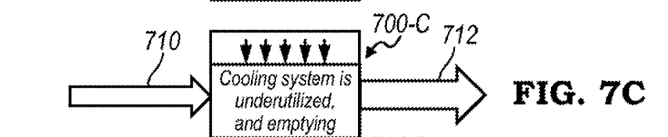
Figure 7D:
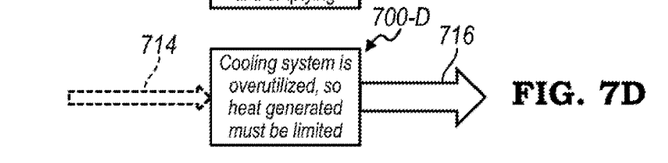

FIG. 6 illustrates an example energy management process 600 for increasing energy efficiency and/or decreasing lap time of the vehicle 102 traveling around the track 202. The process 600 may begin at block 602 where the powertrain controller 110 may detect a beginning of a first lap around the track 202. In some examples, the powertrain controller 110 may receive a user command indicating a first lap around the track 202. In some other examples, the powertrain controller 110 may detect current geographic location of the vehicle 102 indicating that the vehicle 102 is at a beginning of the track 202. Other methods for identifying a beginning of a first lap around the track 202 are also contemplated.

At block 604, during a first lap, the powertrain controller 110 may detect at least one portion, e.g., a length, a segment, of the track 202. In some instances, for each track 202 portion, the powertrain controller 110 may detect changes with respect to time of a steering angle, throttle position, and velocity of the vehicle 102. In some other instances, for each track 202 portion, the powertrain controller 110 may detect changes with time of a steering angle, throttle position, and velocity with respect to temperature of one or more powertrain subsystem components, e.g., the engine 108, the electric machine 104, the traction battery 106, and so on.

At block 606, the powertrain controller 110 may identify at least one track 202 portion such that a low steering angle 212 of the vehicle 102 corresponds to low-to-medium vehicle velocity 214, e.g., less than or equal to 80 mph, and corresponds to a wide-open vehicle 102 throttle position 216. The powertrain controller 110 may then associate the identified track 202 portion with additional available output power. For example, the powertrain controller 110, at block 608, may determine that, while traveling on the identified track 202 portion, available output power of the vehicle 102 may correspond to the maximum output power, $P_{max\_out}$. In some instances, the powertrain controller 110 may determine the additional available output power level greater than the continuous output power, $P_{cont\_out}$ based on amount of time, i.e., duration, to complete the track 202 portion.

The powertrain controller 110, at block 610, may determine an amount of additional thermal energy expected to be generated during the duration of the additional available output power to complete the track 202 portion. For example, the powertrain controller 110 may compare, for a same period of time, i.e., duration, amount of thermal energy generated at each of the continuous output power, $P_{cont\_out}$ and the maximum output power, $P_{max\_out}$.

At block 612, the powertrain controller 110 may determine amount and duration of the limited available output power based on the amount of the additional thermal energy expected to be generated. In one example, the powertrain controller 110 may determine that amount and duration of the limited available output power corresponds to amount and duration of the additional available output power. In another example, the powertrain controller 110 may determine amount and duration of the limited available output power to lower temperature of the powertrain to offset a rise in temperature expected to occur due to the additional available output power. Stated another way, the powertrain controller 110 may be configured to cool the powertrain of the vehicle 102, prior to reaching the track 202 portion associated with the additional available output power, based on an increase in temperature expected during the additional available output power.

At block 614, the powertrain controller 110 may identify at least one track 202 portion both occurring prior to the track 202 portion associated with the additional available output power and during which a low steering angle 212 of the vehicle 102 corresponds to high vehicle velocity 214, e.g., greater than 80 mph, and corresponds to a wide-open vehicle 102 throttle position 216. The powertrain controller 110 may then associate identified track 202 portion with the limited available output power.

The powertrain controller 110 may detect, at block 616, a beginning of a second lap around the track 202. For example, the powertrain controller 110 may receive a user command indicating a second lap around the track 202 and/or detect current geographic location of the vehicle 102 indicating that the vehicle 102 is again at a beginning of the track 202. Other methods for identifying a beginning of a second lap around the track 202 are also contemplated.

At block 618, the powertrain controller 110 may limit available output power of the vehicle 102 powertrain prior to reaching the track 202 portion associated with the additional available output power, such that the available output power of the vehicle 102 corresponds to the preparation output power, $P_{prep\_out}$. For example, the powertrain controller 110 may limit available output power of the vehicle 102 powertrain while traveling through a previously-identified track 202 portion where a low steering angle 212 of the vehicle 102 corresponds to high vehicle velocity 214, e.g., greater than 80 mph, and corresponds to a wide-open vehicle 102 throttle position 216.

In some instances, the powertrain controller 110 may limit the available output power of the vehicle 102, e.g., set the available output power of the vehicle 102 to correspond to the preparation output power, $P_{prep\_out}$, in response to reaching a previously-identified track 202 portion associated with the preparation output power, $P_{prep\_out}$. In some other instances, limiting available output power may cause temperature of the vehicle powertrain to decrease by a pre-defined temperature amount. Further, responsive to reaching an ending point of the track 202 portion associated with the limited available output power, the powertrain controller 110 may inhibit limiting the available output power. As one example, ending of the power limiting may be responsive to a request (by a user, system, and so on) to increase available output power.

Further, upon receiving the request to increase the available output power, the powertrain controller 110 may increase available output power to correspond to the maximum output power, $P_{max\_out}$. In one example, the powertrain controller 110 may continue to operate the vehicle 102, such that available output power to correspond to the maximum output power, $P_{max\_out}$, prior to reaching an ending point of a previously-identified track 202 portion associated with the additional available output power. As another example, the powertrain controller 110 may continue to operate the vehicle 102, such that available output power to correspond to the maximum output power, $P_{max\_out}$, for a period of time, i.e., duration, that is less than or equal to a duration associated with the maximum output power, $P_{max\_out}$ operation.

FIGS. 7A-7D illustrate example block diagrams 700-A, 700-B, 700-C, and 700-D, respectively, for transferring heat to and from a powertrain cooling system 703 of the vehicle 102. The cooling system 703 may be configured to receive, e.g., absorb, heat generated during operation of one or more components of the vehicle 102 powertrain system, such as, but not limited to, the engine 108, the electric machine 104, the traction battery 106, and the transmission 112.

In one example, if the powertrain controller 110 implements management of the cooling system 703 according to a sequence of the diagrams 700-A, 700-B, and 700-C, immediately prior to reaching the segment of the roadway associated with the maximum output power, $P_{max\_out}$, the cooling system 703 may not be able to absorb heat generated during maximum power operation segment. Accordingly, if the vehicle 102 reaches the segment of the roadway associated with the maximum output power, $P_{max\_out}$, the cooling system 703, as illustrated in the diagram 700-D, may be at or near its capacity and the powertrain controller 110 may prevent initiation the maximum output power operation.

Figure 8A:
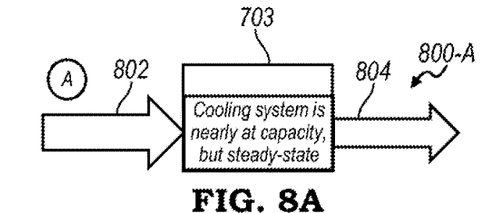
FIGS. 8A-8D are block diagrams illustrating thermal energy management during increase in available output power.
Figure 8B:
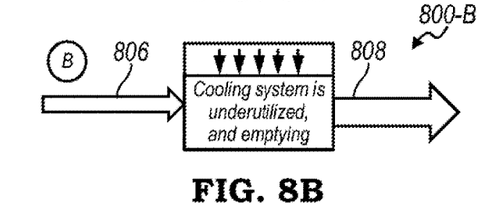
Figure 8C:
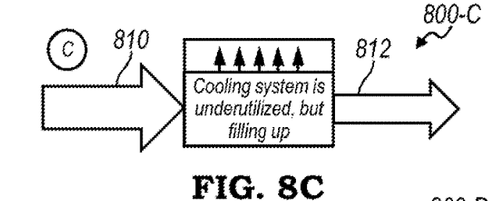
Figure 8D:
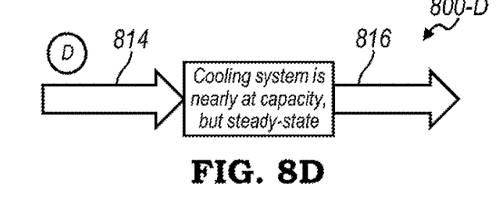
Figure 9:
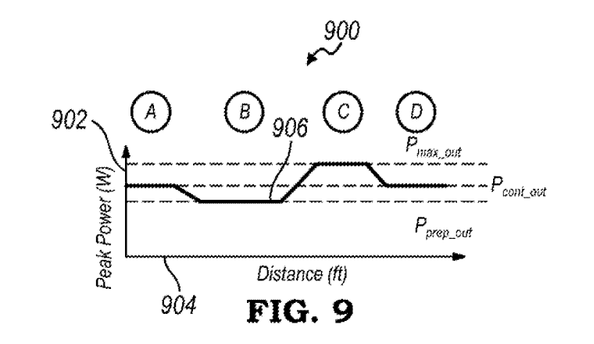
FIG. 9 is a graph illustrating power distribution strategy during the second lap.

FIGS. 8A-8D illustrate example block diagrams 800-A, 800-B, 800-C, and 800-D, respectively, for transferring heat to and from the powertrain cooling system 703 of the vehicle 102 according to the energy management strategy described herein, FIG. 9 illustrates an example power level sequence diagram 900 including segments A, B, C, and D along the track 202.

In one example, while the vehicle 102 is traveling along the segment A of the track 202 illustrated in FIG. 9, the powertrain controller 110 may implement energy management strategy illustrated in the diagram 800-A of FIG. 8A. In another example, while the vehicle 102 is traveling along the segment B of the track 202 illustrated in FIG. 9, the powertrain controller 110 may implement energy management strategy illustrated in the diagram 800-B of FIG. 8B. In still another example, while the vehicle 102 is traveling along the segment C of the track 202 illustrated in FIG. 9, the powertrain controller 110 may implement energy management strategy illustrated in the diagram 800-C of FIG. 8C. In yet another example, while the vehicle 102 is traveling along the segment D of the track 202 illustrated in FIG. 9, the powertrain controller 110 may implement energy management strategy illustrated in the diagram 800-D of FIG. 8D.

Accordingly, during segment A and prior to reaching the segment B, the powertrain controller 110 may set the available output power to correspond to the continuous output power, $P_{cont\_out}$ such that the cooling system 703 of the vehicle 102 is nearly at capacity in a steady-state. In one example, the setting of the available output power to the continuous output power, $P_{cont\_out}$ may be prior to reaching the previously-identified track 202 segment associated with the preparation output power, $P_{prep\_out}$ and/or a low steering angle 212 of the vehicle 102 corresponding to high vehicle velocity 214, e.g., greater than 80 mph, and corresponding to a wide-open vehicle 102 throttle position 216.

The powertrain controller 110, upon reaching the segment B and prior to reaching the segment C, may set the available output power to correspond to the preparation output power, $P_{prep\_out}$ such that the cooling system 703 of the vehicle 102 is underutilized and emptying. As one example, the setting of the available output power to correspond to the preparation output power, $P_{prep\_out}$ during the segment B may cause temperature of one or more powertrain components of the vehicle 102 to decrease, where the segment B is a previously-identified track 202 segment associated with the preparation output power, $P_{prep\_out}$ and/or having a roadway profile such that a low steering angle 212 of the vehicle 102 corresponding to high vehicle velocity 214, e.g., greater than 80 mph, and corresponding to a wide-open vehicle 102 throttle position 216.

Upon reaching the segment C and prior to reaching the segment D, the powertrain controller 110 may set the available output power to correspond to the maximum output power, $P_{max\_out}$ such that the cooling system 703 of the vehicle 102 is underutilized and filling up. In some instances, the setting of the available output power to correspond to the maximum output power, $P_{max\_out}$ during the segment C may cause temperature of one or more powertrain components of the vehicle 102 to increase without causing the cooling system 703 to become overutilized, where the segment C is a previously-identified track 202 segment associated with the maximum output power, $P_{max\_out}$ and/or having a roadway profile such that a low steering angle 212 of the vehicle 102 corresponding to low-to-medium vehicle velocity 214, e.g., less than or equal to 80 mph, and corresponding to a wide-open vehicle 102 throttle position 216.

Upon reaching the segment D, the powertrain controller 110 may decrease the available output power from the maximum output power, $P_{max\_out}$ to the continuous output power, $P_{cont\_out}$ such that the cooling system 703 of the vehicle 102 is nearly at capacity in a steady-state. In some instances, the decreasing of the available output power from the maximum output power, $P_{max\_out}$ upon reaching the segment D may cause an increase in temperature of one or more powertrain components of the vehicle 102 to slow to avoid causing the cooling system 703 to become overutilized, where the segment D follows the segment C, a previously-identified track 202 segment associated with the maximum output power, $P_{max\_out}$ and/or having a roadway profile such that a low steering angle 212 of the vehicle 102 corresponding to low-to-medium vehicle velocity 214, e.g., less than or equal to 80 mph, and corresponding to a wide-open vehicle 102 throttle position 216.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
  a powertrain configured to propel the vehicle, the powertrain including a plurality of powertrain subsystem components; and
  a controller configured to,
    during a first lap of the vehicle around a track, identify a portion of the track corresponding to a correlation of velocity, throttle position, and steering angle values indicative of a maximum power threshold, and,
    during a second lap, responsive to approaching the portion, limit power output by at least one of the plurality of powertrain subsystem components causing temperature of at least one of the plurality of powertrain subsystem components to fall and, upon entering the portion, increase power output to the maximum power threshold causing the temperature to rise, such that a difference in temperature between initiation of the limiting and exiting of the portion approaches zero.

2. The system of claim 1, wherein the correlation includes the velocity being less than 80% of a maximum velocity achieved on the track, the throttle position approaching 100%, and the steering angle approaching zero degrees.

3. The system of claim 1, wherein the controller is further configured to, prior to the entering, cease the limiting and set power to a continuous power threshold less than the maximum power threshold.

4. The system of claim 3, wherein the limiting is based on the rise in temperature expected during the increasing to the maximum power threshold and the ceasing is responsive to temperature falling by an amount corresponding to expected rise.

5. The system of claim 1, wherein the limiting is further responsive to entering a limited power portion of the track identified during the first lap and corresponding to a correlation of velocity being greater than 80% of the maximum velocity, the throttle position approaching 100%, and the steering angle approaching zero degrees.

6. The system of claim 1, wherein the identifying includes detecting geographic coordinates of beginning and ending points of the portion.

7. A powertrain for a vehicle comprising:
a power source configured to propel the vehicle; and
a controller configured to,
during a first lap of a track, operate the source to output a first power threshold while traveling a portion of the track having a predefined correlation of velocity, throttle position, and steering angle,
responsive to entering the portion during a second lap, operate the source to output a second power threshold greater than the first while traveling the portion; and,
responsive to approaching the portion during the second lap, operate the source to output a third power threshold less than the first to cause temperature of the source to fall, such that a difference in temperature between initiation of outputting the third power threshold and ceasing of outputting the second power threshold approaches zero.

8. The powertrain of claim 7, wherein the controller is further configured to, prior to the entering, operate the source to cease outputting the third power threshold and to output the first power threshold.

9. The powertrain of claim 7, wherein the operating at the first and third power thresholds is such that amount of heat generated during the first power threshold may be absorbed by cooling of the source during the third power threshold.

10. The powertrain of claim 7, wherein the correlation includes the velocity being less than 80% of a maximum velocity achieved on the track, the throttle position approaching 100%, and the steering angle approaching zero degrees.

11. The powertrain of claim 10, wherein the operating at the third power threshold is further responsive to entering another portion of the track identified during the first lap and corresponding to a correlation of velocity being greater than 80% of the maximum velocity, the throttle position approaching 100%, and the steering angle approaching zero degrees.

12. The powertrain of claim 7, wherein the entering includes detecting geographic coordinates of a beginning point of the portion.

13. A powertrain for a vehicle comprising:
a power source configured to propel the vehicle; and
a controller configured to,
during a first lap of a track, operate the source to output a first power threshold while traveling a portion of the track having a predefined correlation of velocity, throttle position, and steering angle,
responsive to entering the portion during a second lap, operate the source to output a second power threshold greater than the first while traveling the portion; and,
wherein the correlation includes the velocity being less than 80% of a maximum velocity achieved on the track, the throttle position approaching 100%, and the steering angle approaching zero degrees.

14. The powertrain of claim 13, wherein the operating at the third power threshold is further responsive to entering another portion of the track identified during the first lap and corresponding to a correlation of velocity being greater than 80% of the maximum velocity, the throttle position approaching 100%, and the steering angle approaching zero degrees.

15. The powertrain of claim 13, wherein the entering includes detecting geographic coordinates of a beginning point of the portion.

* * * * *